(12) United States Patent
Satongar et al.

(10) Patent No.: US 10,652,687 B2
(45) Date of Patent: May 12, 2020

(54) METHODS AND DEVICES FOR USER DETECTION BASED SPATIAL AUDIO PLAYBACK

(71) Applicant: Apple Inc., Cupertino, CA (US)

(72) Inventors: Darius A. Satongar, Santa Clara, CA (US); Joshua D. Atkins, Los Angeles, CA (US); Justin D. Crosby, Cupertino, CA (US); Lance F. Reichert, San Francisco, CA (US); Martin E. Johnson, Los Gatos, CA (US); Sawyer Cohen, Cupertino, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 16/126,974

(22) Filed: Sep. 10, 2018

(65) Prior Publication Data

US 2020/0084560 A1    Mar. 12, 2020

(51) Int. Cl.
*H04S 7/00* (2006.01)
*H04B 3/32* (2006.01)
*G06K 9/00* (2006.01)
*H04R 3/14* (2006.01)
*H04B 3/23* (2006.01)

(52) U.S. Cl.
CPC .......... *H04S 7/303* (2013.01); *G06K 9/00228* (2013.01); *H04B 3/23* (2013.01); *H04B 3/32* (2013.01); *H04R 3/14* (2013.01)

(58) Field of Classification Search
None
See application file for complete search history.

(56) References Cited

U.S. PATENT DOCUMENTS

| 6,644,812 B2 | 11/2003 | Kodama et al. |
| 6,990,205 B1 | 1/2006 | Chen |
| 7,130,705 B2 | 10/2006 | Amir et al. |
| 2005/0129254 A1 | 6/2005 | Connor et al. |
| 2006/0256983 A1 | 11/2006 | Kenoyer et al. |
| 2008/0130923 A1 | 6/2008 | Freeman |
| 2008/0226087 A1 | 9/2008 | Kinghorn |
| 2011/0193933 A1 | 8/2011 | Ryu et al. |

(Continued)

OTHER PUBLICATIONS

Virtual Sound using Loudspeakers: Robust acoustic Crosstalk Cancellation, by Darren B Ward, Gary W. Elko; Acoustic Signal Processing for Telecommunication pp. 303-317; —2000.

(Continued)

*Primary Examiner* — James K Mooney
(74) *Attorney, Agent, or Firm* — Womble Bond Dickinson (US) LLP (57) ABSTRACT

A presence of a person within a camera field of view of an electronic device is determined by digitally processing images captured by a camera. A position of a body member of the person with respect to the electronic device is also computed by digitally processing the camera captured images. A crosstalk cancellation (XTC) signal is adjusted based on the computed position of the body member. Adjusting the XTC signal includes adjusting a first predetermined model location, which includes a location at which a user should be in order to achieve a desired virtual acoustics effect. Processing program audio based on the adjusted XTC signal, to generate audio signals that drive speakers. Other aspects are also described and claimed.

15 Claims, 5 Drawing Sheets

(56) References Cited

U.S. PATENT DOCUMENTS

| | | | | |
|---|---|---|---|---|
| 2011/0268281 A1* | 11/2011 | Florencio | ............... | H04S 1/007 |
| | | | | 381/26 |
| 2013/0129103 A1* | 5/2013 | Donaldson | ............ | G10K 11/16 |
| | | | | 381/71.1 |
| 2014/0355765 A1* | 12/2014 | Kulavik | ................. | H04S 7/302 |
| | | | | 381/17 |
| 2015/0208166 A1* | 7/2015 | Raghuvanshi | ......... | H04R 3/002 |
| | | | | 381/71.6 |
| 2015/0264503 A1* | 9/2015 | Hall | ...................... | H04R 3/002 |
| | | | | 381/303 |
| 2016/0353224 A1* | 12/2016 | Reilly | ................... | H04R 27/00 |
| 2017/0195815 A1 | 7/2017 | Christoph et al. | | |
| 2017/0249122 A1 | 8/2017 | Pance et al. | | |

OTHER PUBLICATIONS

3D Audio and Virtual Acoustical Environment Synthesis, by Jiashu Chen; Acoustic Signal Processing for Telecommunication; pp. 283-301; —2000.

Crosstalk Cancellation System Using a Head Tracker Based on Interaural Time Differences, by Yesenia Lacouture-Parodi ; Emanuel A.P. Habets; International Workshop on Acoustic Signal enhancement; 2012 <https://www.researchgate.net/publication/259974894>.

\* cited by examiner

METHODS AND DEVICES FOR USER DETECTION BASED SPATIAL AUDIO PLAYBACK

FIELD

Aspects of the present disclosure relate to virtual acoustics environments, and more particularly to face detection based spatial audio playback in virtual acoustics environments. Other aspects are also described.

BACKGROUND

An audio system may include one or more loudspeakers in a room (or other enclosed sound reflective space) that produce sounds that can be heard at each ear of a user or listener in the room. Typically, a left stereo program audio signal that is driving a loudspeaker that is on the left side of a user may still be heard at the right ear of the user, while a right stereo program audio signal that is driving a right side loudspeaker may be heard at the left ear of the user. In a virtual acoustics environment, however, digital signal processing-based crosstalk cancellation (XTC) techniques may be used to digitally process the left and right stereo program audio signals, before they drive their respective loudspeakers, so as to prevent much of the sound in the left stereo program audio signal from being heard at the right ear of the user, and similarly prevent much of the right stereo program audio signal from being heard at the right ear of the user. This isolation may allow, for example, any arbitrary sound to be reproduced at one ear without bleeding to the other ear. Specifically, by controlling how a program audio signal is reproduced as a sound signal at each ear of the user independently, the hearing impression that the program audio is emanating from a location away from the physical loudspeaker may be achieved (e.g., a virtual loudspeaker/sound source).

In some instances, XTC techniques may use only two loudspeakers (e.g., including two degrees of freedom) to control the sound at each ear of the user separately. XTC techniques may compensate for effects generated by sound that is diffracting around the user's head, by applying what are commonly known as Head Related Transfer Functions (HRTFs) to the audio signals that are driving the loudspeakers so that appropriate (desired or target) ear signals are produced at the left ear and at the right ear. Indeed, in certain instances, for XTC techniques to operate most efficiently, the user may be required to remain within a specified location relative to the loudspeakers within a room or other enclosed space. Should the user move outside the specified location, the virtual acoustics effects may diminish and the audio may appear as emanating from the physical loudspeakers instead of from a desired virtual acoustic source location or direction. It may be useful to provide techniques to improve XTC techniques in virtual acoustics environments.

BRIEF DESCRIPTION OF THE DRAWINGS

The aspects of the disclosure are illustrated by way of example and not by way of limitation in the figures of the accompanying drawings in which like references indicate similar elements. It should be noted that references to "an" or "one" aspect of the disclosure in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect. In the drawings.

SUMMARY

One aspect of the disclosure here is a method for face detection based spatial audio playback in virtual acoustics environments. The method includes generating first audio signals (e.g., program audio), and determining a presence of a user within a field of view of an electronic device. In response to determining the presence of the user within the field of view, the method further includes determining a position of a body member of the user, particularly the user's head, with respect to the electronic device (and by implication the position with respect to at least a left loudspeaker and a right loudspeaker that are part of the virtual acoustic system, and adjusting a crosstalk cancellation (XTC) signal based on the position of the body member. Adjusting the XTC signal includes adjusting a first predetermined model location, which includes a location at which the user should be in order to achieve a desired virtual acoustics effect. The method further includes generating second audio signals based on the adjusted XTC signal, in which the second audio signals are to drive speakers that produce sound of the program audio that the user hears.

In another aspect, an electronic device for providing face detection based spatial audio playback in virtual acoustics environments is provided. The electronic device includes a processor configured to generate first audio signals, and to determine a presence of a user within a field of view of the electronic device. In response to determining the presence of the user within the field of view, the processor is to determine a position of a body member of the user with respect to the electronic device, e.g., how far the user's head is to the left of for example a center axis the device, or how far to the right, and further to adjust a crosstalk cancellation (XTC) signal based at least in part on the determined position of the body member with respect to the electronic device. Adjusting the XTC signal includes adjusting a first predetermined model location, in which the first predetermined model location includes a location at which the user should be in order to achieve a desired virtual acoustics effect. The processor is to generate second audio signals based at least in part on the adjustment of the XTC signal. The second audio signals are to drive speakers which produce sound that the user hears.

In an aspect, an electronic device for providing face detection based spatial audio playback in virtual acoustics environments is provided. The electronic device includes a processor configured to generate first audio signals, and to determine a presence of a user within a field of view of the electronic device. In response to determining the presence of the user within the field of view, the processor is to determine a position of a body member of the user with respect to the electronic device, e.g., the user's head, and further to adjust a crosstalk cancellation (XTC) signal based at least in part on the determined position. Adjusting the XTC signal includes adjusting a first predetermined model location, in which the first predetermined model location includes a location at which the user should be in order to achieve a desired virtual acoustics effect. The processor is further to generate second audio signals based at least in part on the adjustment of the XTC signal. The second audio signals are to drive speakers which produce sound that the user hears.

In an aspect, a non-transitory computer-readable medium having computer executable instructions stored thereon for providing face detection based spatial audio playback in virtual acoustics environments is provided. The computer executable instructions cause a processor to generate first audio signals, and to determine a presence of a user within a field of view of an electronic device. In response to determining the presence of the user within the field of view, the processor is to determine a position of a body member of the user with respect to the electronic device, and further to adjust a crosstalk cancellation (XTC) signal based at least in part on the determined position. Adjusting the XTC signal includes adjusting a first predetermined model location, in which the first predetermined model location includes a location at which the user should be in order to achieve a desired virtual acoustics effect. The processor is further to generate second audio signals based at least in part on the adjustment of the XTC signal. The second audio signals are to drive speakers which produce sound that the user hears.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

DETAILED DESCRIPTION

Several aspects of the disclosure with reference to the appended drawings are now explained. Whenever the shapes, relative positions and other aspects of the parts described are not explicitly defined, the scope of the disclosure is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Methods and devices for face detection based spatial audio playback in virtual acoustics environments are provided. By way of example, audio and image processing circuitry of an electronic device such as a laptop computer, a desktop computer, a mobile phone, or a tablet computer may generate a first plurality of audio signals, and determine a presence of one or more users within a field of view of the electronic device. In response to determining the presence of the one or more users within the field of view of the electronic device, the audio and image processing circuitry may further determine a position of a body member of the one or more users, e.g., head position, with respect to the electronic device.

The audio and image processing circuitry may then perform one or more adjustments to a crosstalk cancellation (XTC) signal (e.g., control signal that defines the filter coefficients of a digital crosstalk cancellation filter) based at least in part on the determined position of the body member with respect to the electronic device, and generate a second plurality of audio signals for play back based at least in part on the one or more adjustments to the XTC signal. Specifically, as will be further appreciated herein, the audio and image processing circuitry may be utilized to determine the presence and orientation of one or more users within a virtual acoustics environment, and to adjust the XTC filtering signals to improve and augment a predetermined model location (e.g., which may be referred to herein as a "sweet spot") in which one or more users are to reside for enhanced virtual acoustics performance. In this way, the present techniques may provide users (e.g., groups of users) additional freedom of movement within virtual acoustics environments while maintaining the virtual acoustic effects.

Figure 1:
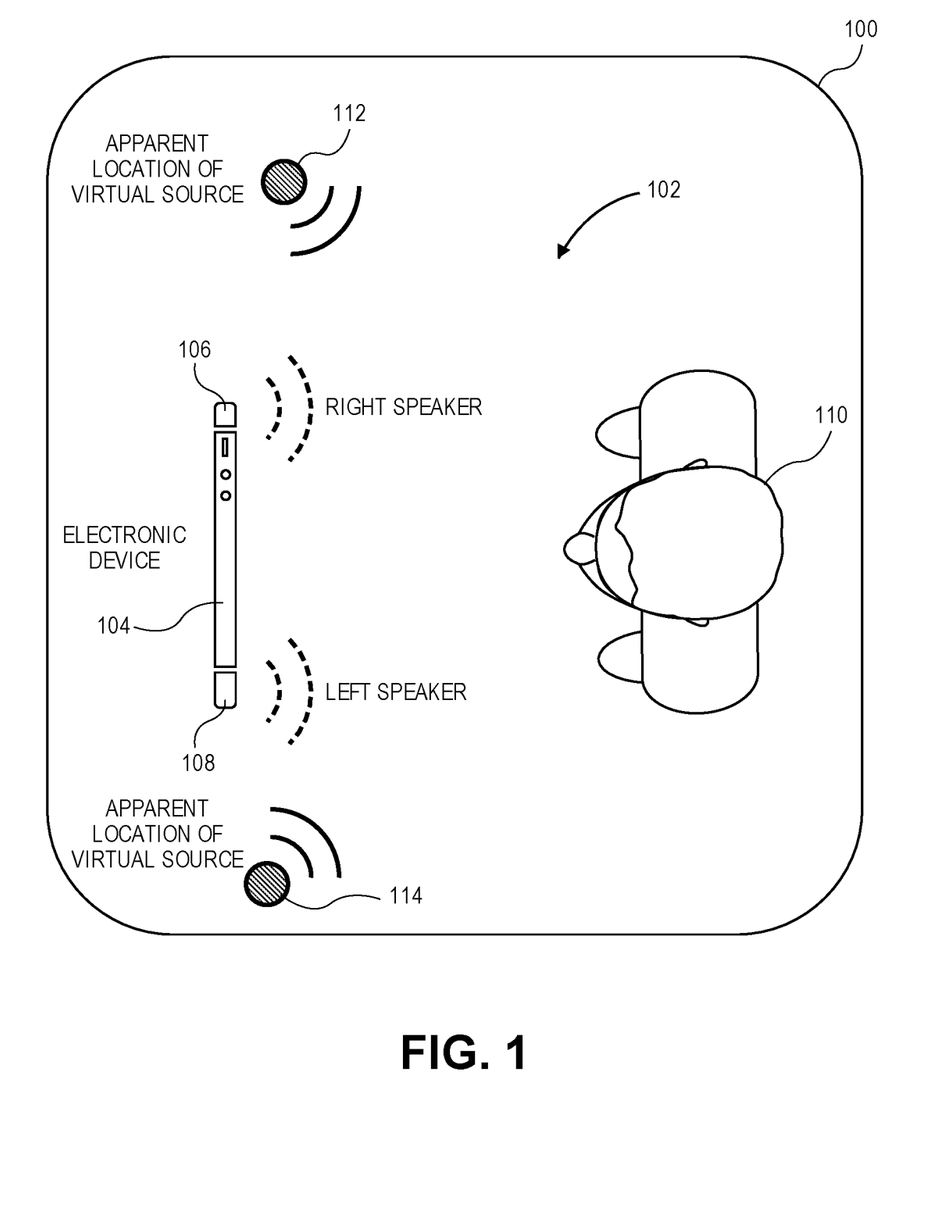
FIG. 1 is a diagram illustrating an example virtual acoustic environment including one or more loudspeakers within a listening area.

A general description of an electronic device that may employ audio and imaging processing circuitry useful in providing face detection based spatial audio playback in virtual acoustics environments is provided below. Turning to FIG. 1, an illustration of a virtual acoustics environment 100 in accordance with one aspect of the disclosure is depicted. As depicted, the virtual acoustics environment 100 may include an audio listening area 102, an electronic device 104 including right speaker 106 and left speaker 108, and one or more users 110 that may be enjoying or consuming one or more forms of media (e.g., video media, audio media) via the electronic device 104. The audio listening area 102 may include, for example, a room or other enclosed space. For example, the listening area 102 may include one or more rooms within a residence or other building. Although illustrated as an enclosed space, the listening area 102 may alternatively include an outdoor area or location including an outdoor arena, for example.

In one aspect, the electronic device 104 and the right speaker 106 and left speaker 108 (e.g., loudspeakers) may be integrated within a single unit (e.g., built-in speakers of a laptop computer, a tablet computer, or a mobile phone.) In another aspect, the electronic device 104 may be communicatively coupled via wired or wireless communication links to the left and right speakers, the latter being external speakers (external to a housing of the electronic device 104, e.g., self-powered or self-amplifying loudspeaker cabinets.) In both instances, the electronic device is to drive the left and right speakers to emit audio to be consumed by the one or more users 110. In some aspects, the left and right speakers may be specifically placed within the listening area 102 to produce audio that may be perceived by the one or more users 110 to be emanating from the left and right speakers, emanating from left virtual sound source 114 and right virtual sound source 112, or emanating from a combination of the left and right speakers and the left and right virtual sound sources.

Figure 2:
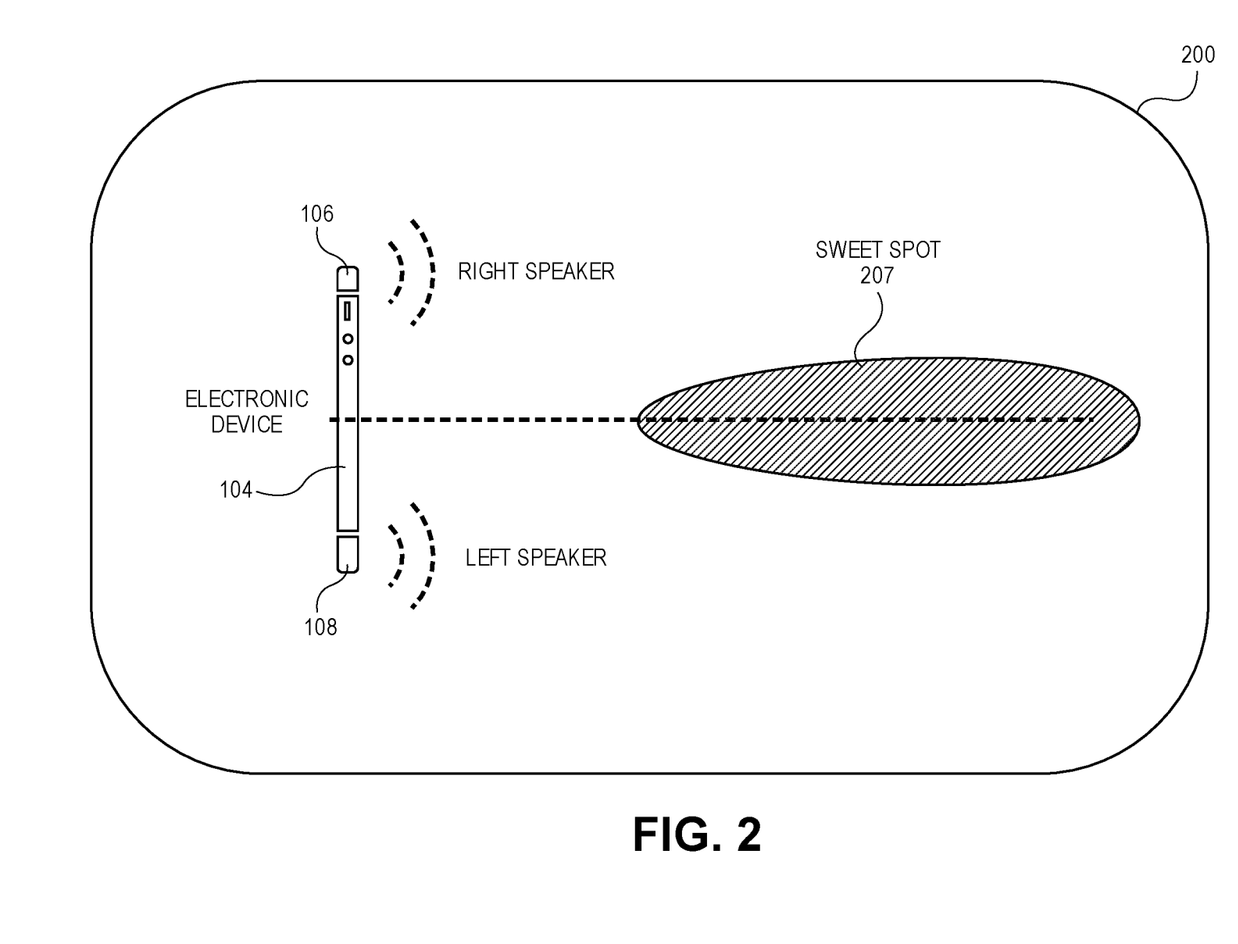
FIG. 2 is a diagram illustrating an example of a "sweet spot" within a listening area.

In certain aspects, as illustrated by FIG. 2, to generate virtual acoustic effects within the virtual acoustics environment 200, the electronic device 104 may utilize one or more XTC techniques to, for example, cause audio sources (program audio) to be perceived at the opposing left and right sides of the electronic device 104 as shown, via left and right speakers and/or one or more generated virtual sources serving as extensions to the left and right speakers. For example, in one or more aspects, the electronic device 104 may transform the individual left and right program audio into a respective set of mid-side components for each one. The electronic device 104 may then apply a set of filters to the respective mid-side components to perform XTC based on a position of the one or more users 110 (e.g., how far to the left or how far to the right of a computing device that is producing the audio signals which is driving the left speaker 108 and the right speaker 106, which directly results in the audio signals driving those real speakers to produce the virtual sound sources (e.g., left virtual sound source 114 and right virtual sound source 112) within the virtual acoustics environment 200.

In some aspects, for XTC techniques to function properly, the one or more users 110, for example, may be required to remain within a predetermined model location 207 (e.g., "sweet spot"). As illustrated in FIG. 2, the sweet spot may include a predefined boundary in which the one or more users 110 may be required to reside for a desired, e.g., the best possible, virtual acoustics experience for the one or more users 110. For example, in some aspects, the sweet spot may be set to, for example, 0° relative to a center front normal axis of the electronic device 104 (e.g., bisecting while being normal to a straight line that connects the left speaker 108 and the right speakers 106 and aimed in the primary direction of sound emission by the left and right speakers). The sweet spot may include a generally elongated oval shape as illustrated by FIG. 2.

Figure 3:
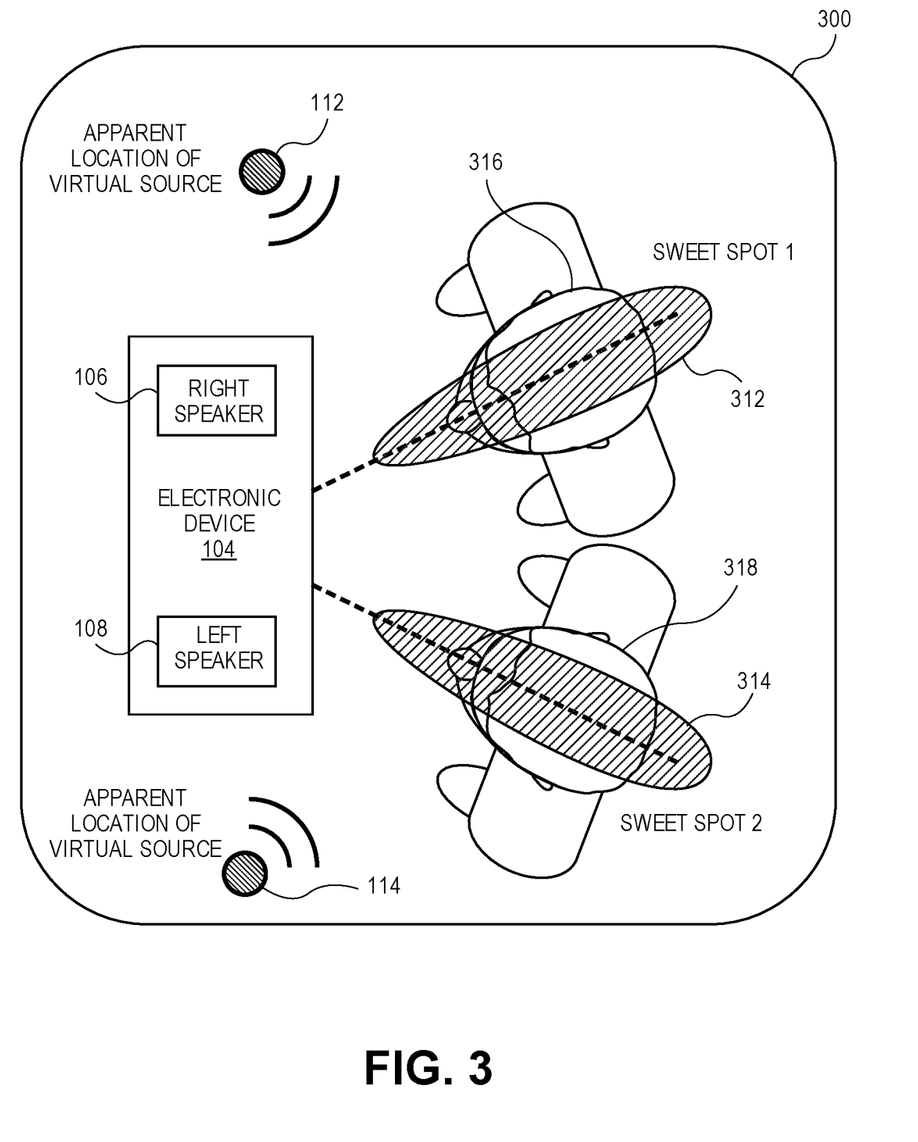
FIG. 3 is a diagram illustrating two "sweet spots" within a listening area.

Indeed, should the one or more users 110 move outside of the sweet spot or equivalently the device is moved or one or both of the speakers 106, 108 are moved relative to a stored (and relied upon) sweet spot, the virtual acoustics effects within the virtual acoustics environment 200 may diminish and the audio may be thus perceived as emanating directly from the left loudspeaker 108 and the right loudspeaker 106 as opposed to, for example, from the virtual sound sources (e.g., left virtual sound source 114 and right virtual sound source 112—see FIG. 1) which are spaced further outward from the real speakers (further to the left of the left speaker 108 and further to the right of the right speaker 106 as shown.) In other aspects, for example as illustrated by the virtual acoustics environment 300 in FIG. 3, in systems including a version of the electronic device 104 that has only the left speaker 108 and the right speaker 106 for producing sound for multiple users 316 and 318, the virtual acoustics effects within the virtual acoustics environment 300 may diminish (e.g., due to a reduction in area of the predetermined model locations 312 ["sweet spot 1"] and 314 ["sweet spot 2"] because the virtual acoustics effects are more sensitive to movement of the user out of that users assigned sweet spot). Thus, the sound may be perceived as emanating directly from the left speaker 108 and the right speaker 106 as opposed to, for example, from the virtual sound sources 114, 112. Specifically, utilizing an electronic device 104 that includes only the pair of left speaker 108 and right speaker 106, it may not be possible to create the virtual acoustics effect concurrently for each of the multiple users 316 and 318 positioned side by side, for example. Accordingly, as will be appreciated in more detail with respect to FIGS. 4 and 5, it may be thus useful to provide techniques to improve XTC techniques in such virtual acoustics environments.

Figure 4:
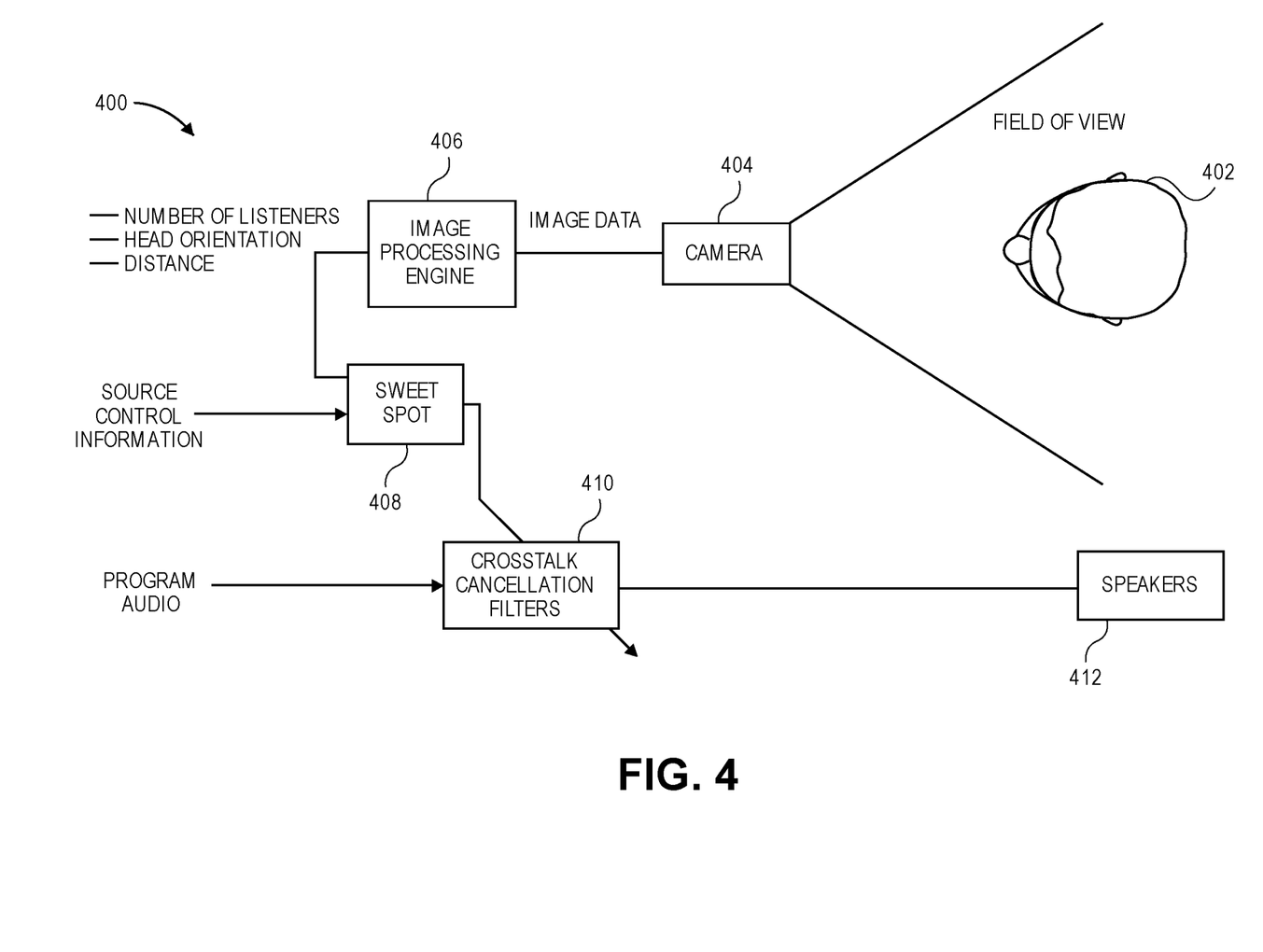
FIG. 4 is a block diagram illustrating an example of the audio and image processing circuitry that is used to achieve spatial audio playback.

For example, as illustrated in FIG. 4, it may be useful to provide audio and image processing circuitry 400 to determine the presence and position of one or more users 402 within a virtual acoustics environment and to adjust the XTC filters based thereon. As depicted, the audio and image processing circuitry 400 may include a camera 404, an image processing engine 406, a sweet spot generator 408, and one or more crosstalk cancellation (XTC) filters 410. The camera 404 may be part of an optical digital camera having a given field of view, that captures 2D digital images of the field of view before it (e.g., here containing a person, also referred to as a listener or one or more users 402); in addition or as an alternative, the camera 404\ may be part of a structured light scanner that produces 3D images of one or more persons in the field of view.

In some aspects, the image processing engine 406 (e.g., face detection engine, face recognition engine) may be used to determine the presence and position of the one or more users 402 based on image data and/or reflected light detected via the camera 404. For example, the image processing engine 406 may include, for example, one or more digital signal processors (DSPs), one or more graphic processing units (GPUs), one or more system-on-chip (SoC), one or more multiprocessor DSPs, one or more vision processing units (VPUs), one or more video display controllers (VDCs), one or more vector processors, or any of various other data processing circuitry that may be useful in processing and modifying image data signals received from the camera 404.

Specifically, during operation, the image processing engine 406 may receive data (e.g., light data, image data) and process and pass the data (e.g., image data) to the sweet spot generator 408. The sweet spot generator 408 in conjunction with the image processing engine 406 (e.g., face detection engine, face recognition engine), in one or more aspects, may then determine a position of the head or other body member of the one or more users 402 with respect to the electronic device 400, e.g., as an angle to the left or an angle to the right of a center axis of the device, based on information (e.g., image data, light data) received from the camera 404.

In certain aspects, the sweet spot generator 408 may adjust the XTC filters 410 based on the head position data (e.g., including distance to the head and angle or direction of the head) collected with respect to the one or more users 402. For example, a programmed processor (as the sweet spot generator 408) may adjust the XTC filters 410, and, by extension or as an inherent result, adjust (e.g., enlarging, changing shape, shrinking, changing orientation, and so forth) the predetermined model location (e.g. "sweet spot") in accordance with the position data collected with respect to the one or more users 402.

In another example, for instance in the case in which more than one user 402 is detected within the field of view of the electronic device 400, the sweet spot generator 408 may adjust the XTC filters 410 by temporarily suspending the XTC filters 410 (e.g., temporarily switching off the XTC filters 410 such that the left channel of a stereo pair is fed only to the left speaker, and a right channel is fed only to the right speaker and without any relative time delay between them) or by generating additional predetermined model locations (e.g. additional "sweet spots" such that respective "sweet spots" are defined for each one of the one or more users 402). Output audio signals (e.g., left and right speaker driver signals) as adjusted (filtered) by the modified XTC filters 410 may be then outputted to drive the speakers 412 (e.g., left and right loudspeakers) for play back.

Figure 5:
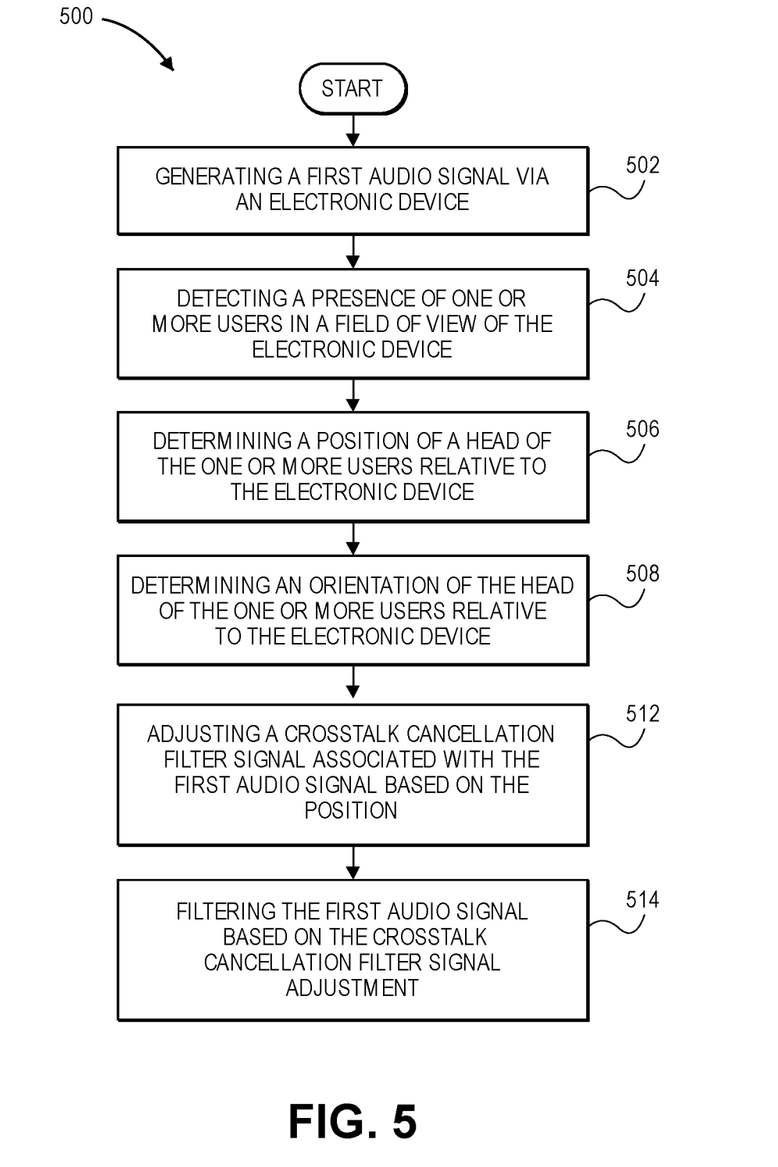
FIG. 5 is a flow diagram illustrating a method for providing face detection based spatial audio playback in virtual acoustics environments.

Turning now to FIG. 5, this illustrates a flow diagram of a method 500 for providing face detection based spatial audio playback in virtual acoustics environments, in accordance with the present aspects. In some aspects, the method 500 may be performed by processing logic that may include hardware such as one or more processors, software (e.g., instructions running/executing on a computer processing device), firmware (e.g., microcode), or a combination thereof. The method 500 may begin at block 502 with generating a first plurality of audio signals (e.g., left and right audio signals) via an electronic device (e.g., electronic device 400).

The method 500 may continue at block 504 with detecting a presence of one or more users in a field of view of the electronic device. For example, in one aspect, the camera 404 of the electronic device 400 may capture an image of the one or more users 402, and the image processing engine 406 may determine the presence of the one or more users based thereon. In another aspect, reflection from light emitted into the direction of the user 402 may be detected by the camera 404 (e.g., including a structured light scanner), and the image processing engine 406 may determine the presence of the one or more users 402 based on the reflected light.

The method 500 may then continue at block 506 with determining a position (e.g., a distance and a particular direction) of a head or other body member of the one or more users 402 with respect to the electronic device 400. The method 500 may then continue at block 508 with determining an orientation of the head (e.g., head pose) or other body member of the one or more users with respect to the electronic device (e.g., electronic device 400). For example, as previously noted, the image processing engine 406 may determine the position and optionally the orientation of the head or other body member of the one or more users 402 based on information (e.g., image data, light data) received from the camera 404. The method 500 may then continue at block 512 with adjusting a crosstalk cancellation (XTC) signal associated with the first plurality of audio signals based on the position data and optionally based on the head orientation (e.g., head pose) data collected with respect to the one or more users 402.

For example, the sweet spot generator 408 may adjust the XTC signal by adjusting (e.g., enlarging, changing shape, shrinking, changing orientation, and so forth) a first predetermined model location (e.g. a first "sweet spot" corresponding to the first user 402). In another example, for instance in the case in which more than one user 402 is detected within the field of view of the electronic device 400, the sweet spot generator 408 may adjust the XTC signal by temporarily suspending the XTC signal or by generating a second predetermined model location (e.g. a second "sweet spot" corresponding to the second user 318—see FIG. 3). The method 500 may then conclude at block 514 with generating a second plurality of audio signals by filtering the first audio signals based on the adjustment to the XTC signal. For example, the second plurality of audio signals (e.g., filtered left and right audio signals) may be outputted to the speakers 412 (e.g., left and right loudspeakers) to be played back.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, for example a computing device having a processor that is programmed by a computer program stored in the computing device. Such a computer program may be stored in a computer-readable non-transitory storage medium such as solid state memory.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular aspects only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware-for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. sec. 112, sixth paragraph, for that unit/circuit/component.

The foregoing description, for the purpose of explanation, has been described with reference to specific aspects of versions. However, the illustrative discussions above are not intended to be exhaustive or to limit the disclosure to the precise forms disclosed. Many modifications and variations are possible in view of the above teachings. The aspects were chosen and described in order to best explain the principles of the aspects and their practical applications, to thereby enable others skilled in the art to best utilize the aspects and various modifications as may be suited to the particular use contemplated. Accordingly, the present aspects are to be considered as illustrative and not restrictive, and the disclosure is not to be limited to the details given herein, but may be modified within the scope and equivalents of the appended claims.

What is claimed is:

1. A method for spatial audio playback processing, comprising:
   generating, by a processor of a portable electronic device, a first plurality of audio signals that include a stereo pair having a left channel and a right channel;
   determining by the processor, a presence of a user within a field of view of the electronic device;
   in response to determining the presence of the user within the field of view, determining by the processor a position of a body member of the user with respect to the electronic device;
   adjusting a crosstalk cancellation (XTC) signal based on the determined position of the body member with respect to the electronic device, wherein adjusting the XTC signal comprises adjusting a first predetermined model location, the first predetermined model location including a location at which the user should be in order to achieve a desired virtual acoustics effect;
   generating a second plurality of audio signals based on the adjusted XTC signal, wherein the second plurality audio signals are to drive a plurality of speakers that include a left speaker and a right speaker that are integrated in the electronic device and which produce sound that the user hears as emanating from a plurality of virtual sound sources; and
   when a presence of a second user is detected within the field of view of the electronic device, temporarily suspending the XTC signal by switching off a plurality of XTC filters so that the left channel of the stereo pair is fed only to the left speaker and the right channel of the stereo pair is fed only to the right speaker without any relative time delay.

2. The method of claim 1, wherein generating the first plurality of audio signals comprises generating a first left audio signal and a first right audio signal.

3. The method of claim 2, wherein generating the second plurality of audio signals comprises generating a second left audio signal to drive one of the plurality of speakers and a second right audio signal to drive another one of the plurality of speakers.

4. The method of claim 1, wherein determining the presence of the user within the field of view comprises capturing an image of the field of view via an integrated camera of the electronic device.

5. The method of claim 1, wherein determining the presence of the user within the field of view comprises detecting a reflection of light emitted into the field of view via a structured light scanner of the electronic device.

6. The method of claim 1, wherein determining the position of the body member of the user comprises determining a position of a head of the user with respect the electronic device.

7. The method of claim 1, wherein adjusting the XTC signal comprises generating a second predetermined model location, the second predetermined model location including a location at which the second user should be to achieve a desired virtual acoustics effect.

8. The method of claim 1, wherein the second plurality of audio signals are to drive the plurality of speakers being integrated within a housing of the electronic device along with a camera that is used to determine the position of the user.

9. An electronic device, comprising:
   a left speaker integrated in a housing of a portable electronic device;
   a right speaker integrated in the housing of the portable electronic device,
   a camera integrated in the housing of the portable electronic device; and
   a processor configured to:
      generate a first plurality of audio signals that include a stereo pair having a left channel and a right channel;
      determine a presence of a user within a field of view of the camera in the portable electronic device;
      in response to determining the presence of the user within the field of view, determine a position of a body member of the user with respect to the portable electronic device;
      adjust a crosstalk cancellation (XTC) signal based on the position of the body member with respect to the portable electronic device, wherein adjusting the XTC signal comprises adjusting a first predetermined model location that includes a location at which the user should be in order to achieve a desired virtual acoustics effect;
      generate a second plurality of audio signals based on the adjustment of the XTC signal, wherein the second plurality audio signals are to drive a plurality of speakers that produce sound which the user hears as emanating from a plurality of virtual sound sources; and
      when a presence of a second user is detected within the field of view of the portable electronic device, temporarily suspending the XTC signal by switching off a plurality of XTC filters so that the left channel of the stereo pair is fed only to the left speaker and the right channel of the stereo pair is fed only to the right speaker without any relative time delay.

10. The electronic device of claim 9, wherein to determine the position of the body member of the user, the processor is configured to determine a position of a head of the user with respect to the electronic device.

11. The electronic device of claim 9, wherein to adjust the XTC signal, the processor is configured to generate a second predetermined model location, the second predetermined model location including a location at which the second user is to reside within to achieve a desired virtual acoustics effect.

12. A portable audio device comprising
   a portable audio device housing having integrated therein a display screen flanked by a left speaker and a right speaker, a camera, a processor, and a memory having stored therein instructions that when executed by the processor:
      generate a first plurality of audio signals that include a stereo pair having a left channel and a right channel;
      determine a presence of a user within a field of view of the camera;
      in response to determining the presence of the user within the field of view, determine a position of a body member of the user with respect to the portable audio device;
      adjust a crosstalk cancellation (XTC) signal based on the position of the body member with respect to the electronic device, wherein adjusting the XTC signal comprises adjusting a first predetermined model location, the first predetermined model location including a location at which the user should be in order to achieve a desired virtual acoustics effect;

generate a second plurality of audio signals based on the adjustment of the XTC signal, wherein the second plurality audio signals are to drive a plurality of speakers to produce sound that the user hears as emanating from a plurality of virtual sounds sources; and when a presence of a second user is detected within the field of view of the camera, temporarily suspend the XTC signal by switching off a plurality of XTC filters so that the left channel of the stereo pair is fed only to the left speaker and the right channel of the stereo pair is fed only to the right speaker without any relative time delay.

13. The portable audio device of claim 12 wherein to adjust the XTC signal, the processor is configured to adjust filter coefficients of a plurality of digital crosstalk cancellation filters that are to filter the first plurality of audio signals to generate the second plurality of audio signals.

14. The portable audio device of claim 12, wherein to determine the position of the body member of the user, the processor is to determine a position of a head of the user as being to a left of or to a right of a center axis of the electronic device.

15. The portable audio device of claim 12, wherein to adjust the XTC signal, the processor is configured to generate a second predetermined model location, the second predetermined model location including a location at which the second user is to reside within for maximum virtual acoustics effect.

* * * * *

UNITED STATES PATENT AND TRADEMARK OFFICE
CERTIFICATE OF CORRECTION

PATENT NO. : 10,652,687 B2
APPLICATION NO. : 16/126974
DATED : May 12, 2020
INVENTOR(S) : Darius A. Satongar et al.

Page 1 of 1

It is certified that error appears in the above-identified patent and that said Letters Patent is hereby corrected as shown below:

In the Claims

Column 10, Claim 12, Lines 62-63, delete "the electronic device" and insert -- an electronic device --

Signed and Sealed this
Fourth Day of August, 2020

Andrei Iancu
*Director of the United States Patent and Trademark Office*